(No Model.)  J. B. CLYNE.  4 Sheets—Sheet 1.
MACHINE FOR MAKING SCREWS.

No. 469,201.  Patented Feb. 16, 1892.

Witnesses
E. Byron Gilchrist

Inventor
James B. Clyne (No Model.) 4 Sheets—Sheet 2.

J. B. CLYNE.
MACHINE FOR MAKING SCREWS.

No. 469,201. Patented Feb. 16, 1892.

Witnesses
E. Byron Gilchrist

Inventor.
James B. Clyne (No Model.) 4 Sheets—Sheet 4.
J. B. CLYNE.
MACHINE FOR MAKING SCREWS.

No. 469,201. Patented Feb. 16, 1892.

Witnesses.

Inventor.

UNITED STATES PATENT OFFICE.

JAMES B. CLYNE, OF CLEVELAND, OHIO, ASSIGNOR, BY DIRECT AND MESNE ASSIGNMENTS, TO THE WHITE SEWING MACHINE COMPANY, OF SAME PLACE.

MACHINE FOR MAKING SCREWS.

SPECIFICATION forming part of Letters Patent No. 469,201, dated February 16, 1892.

Application filed January 23, 1891. Serial No. 378,791. (No model.)

*To all whom it may concern:*

Be it known that I, JAMES B. CLYNE, of Cleveland, in the county of Cuyahoga and State of Ohio, have invented certain new and useful Improvements in Machines for Manufacturing Screws; and I do hereby declare the following to be a full, clear, and exact description of the invention, such as will enable others skilled in the art to which it pertains to make and use the same.

My invention relates to improvements in mechanism for manufacturing screws, in which the feed mechanism for advancing and retiring the different tools comprises, first, a cam for moving the tool-turret toward and from the work, and, second, adjustable mechanism for varying the speed of such cam as may be necessary in feeding the different tools faster or slower as the respective tools may require, according to the nature of the work they have to do. In place of an upright turret having the tools projecting therefrom in radial directions I employ a horizontal turret or cylinder with the tools inserted in the end thereof and projecting endwise from the turret, whereas the locking device is applied to the periphery of the turret, whereby greater accuracy is obtained in locking the turret to hold the latter stationary while the different tools are being advanced to their respective work.

My invention also relates to the details of construction hereinafter described, and pointed out in the claims.

Figure 1:
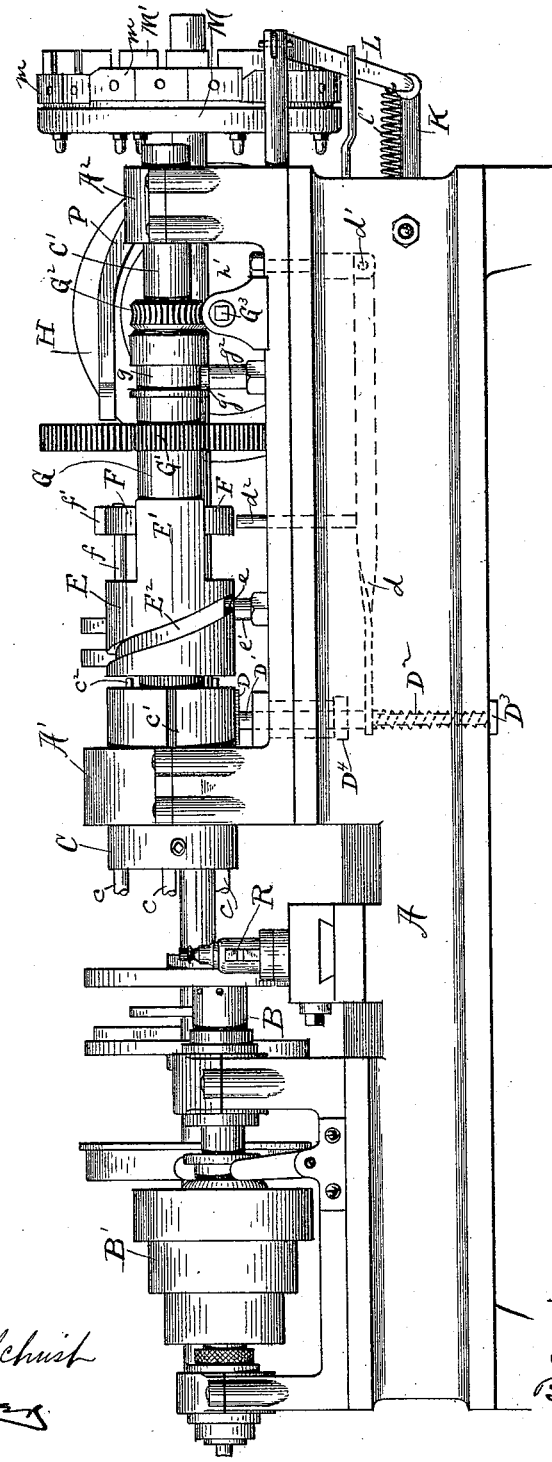
Figure 2:
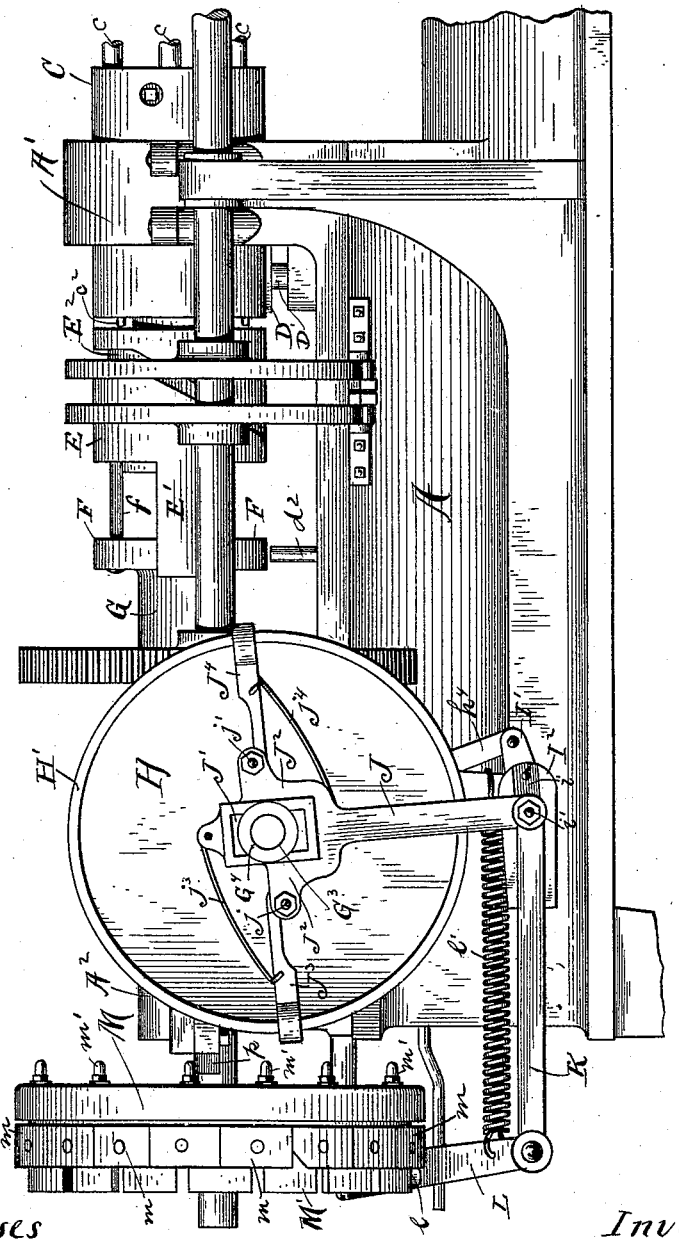
Figure 3:
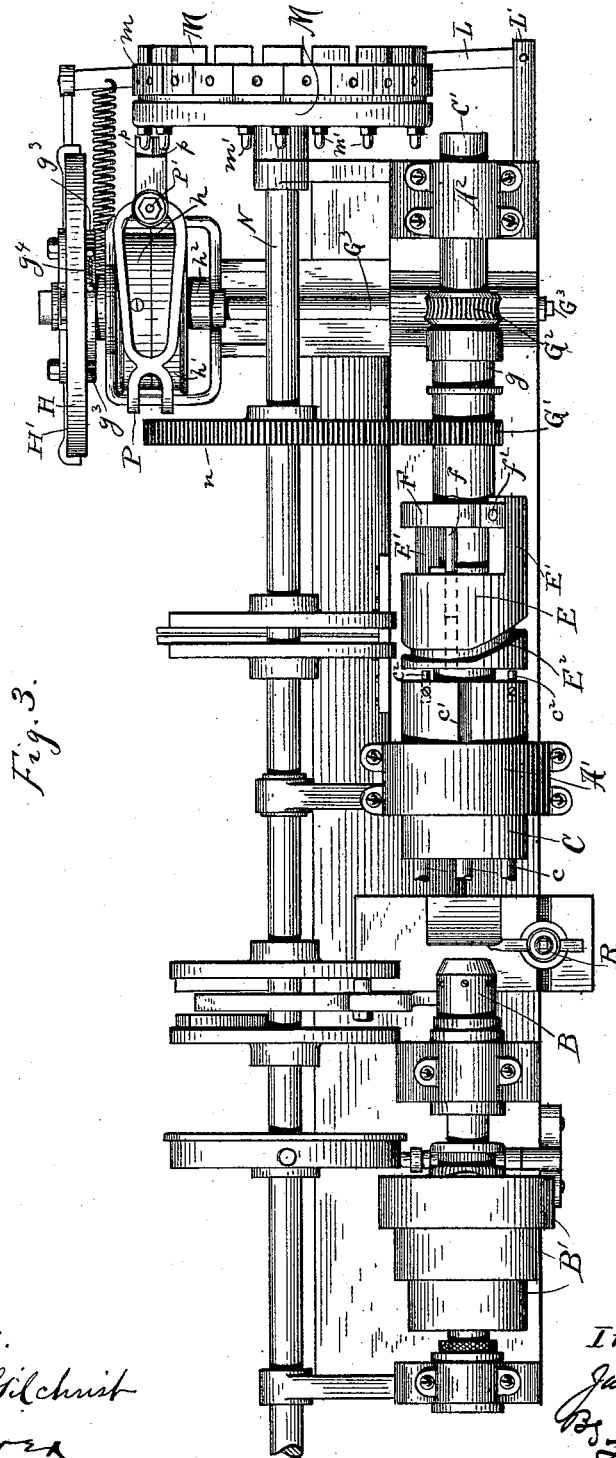
Figure 4:
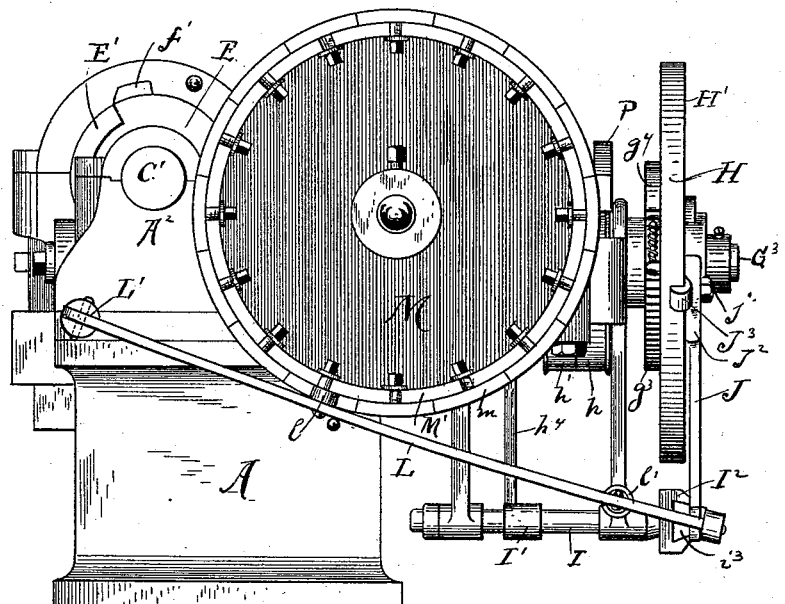
Figure 6:
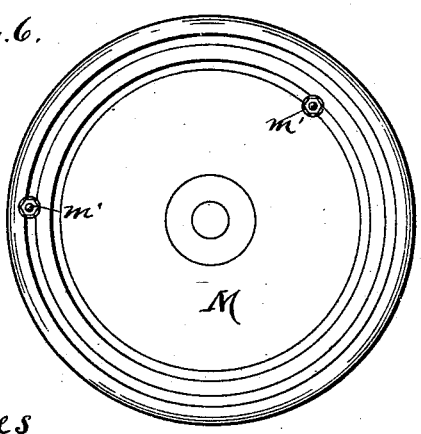
Figure 5:
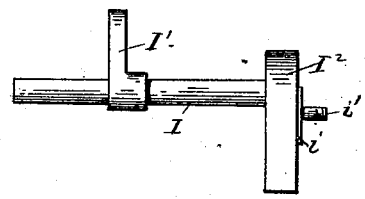

In the accompanying drawings, Figure 1 is a front side elevation. Fig. 2 is a rear side elevation somewhat enlarged and showing the central and tail end portions of the machine. Fig. 3 is a plan. Fig. 4 is an end elevation of the tail end of the machine. Fig. 5 is a plan of rock-shaft I and attachments. Fig. 6 is an elevation showing the reverse side of wheel M.

A represents the bed of the machine, not unlike the bed of an ordinary lathe.

B is the chuck for holding the work, and B' is the cone-pulley of the hollow chuck-spindle. The chuck is of the automatic variety, of which there are several in use that would answer the purpose; but for this work I prefer the chuck shown and described in United States Letters Patent No. 333,198, granted me December 29, 1885, and to which reference is hereby made. Heretofore machines for such purpose have usually been provided with a revolving tool-bearing turret, such turret having a vertical axis and the tools projecting from the turret in radial directions for some distance beyond the periphery of the turret, while the locking device was usually applied to a reduced section or member of the turret. Hence any inaccuracy of the locking device was multiplied at the extremes of the tool. Now it is essential that each tool be held accurately in place while doing its work, otherwise the work of different tools would not correspond or register and the accuracy with which the different tools are held in place depends upon the accuracy of the locking device for the turret. In view of the foregoing I have discarded such upright turret, and in place thereof I employ a horizontal turret or cylinder C, this turret being rigidly mounted on the forward end of the turret-shaft C'. The turret C is journaled in a stationary box A', and shaft C', near the rear end of the machine, is journaled in a stationary box A², the arrangement being such that the turret and its shaft may not only revolve on their common axis in bringing the different tools in position opposite the work, but the turret and shaft may also reciprocate endwise through their journal-boxes in advancing and retiring the tool, so that the different tools may successively do their work. As shown, these journal-boxes are located so far apart that there is no tendency of the turret to wabble, as might be the case if these boxes were near to each other. The different tools $c\ c\ c\ c$ are inserted in longitudinal holes drilled in the forward end of the turret, these tools being of course in concentric order with the axis of the turret, and hence the tools revolve in a circle considerably less in diameter than the diameter of the turret.

The locking device for the turret is as follows: The turret is provided with a series of longitudinal radial slots $c'$, there being as many such slots as there are to be tools borne by the turret, these slots being slightly tapering, as would be the case if the side walls thereof were on radial lines, and a correspondingly wedge-shaped block or dog D, known as the "lock," is mounted on an upright rod D′, this rod fitting nicely in vertical holes in the flanges of the bed or attachments of the latter, so that the rod and attached lock may reciprocate vertically, or toward and from the axis of the turret. Rod D′ is provided with a spring, as at $D^2$, for elevating the rod and lock in locking the turret. This rod next below the bed is provided with a nut $D^3$, that by engaging the bed serves as a stop to limit the upward movement of the lock, so that the lock may be wedged into the opposing slot, so as to prevent the turret from reciprocating endwise while thus locked as against turning on its axis, for it will be remembered that the lock is thrust home instantaneously by the action of its spring, and were it not for the stop the lock would likely be wedged into the slot so firmly that the turret could not easily be moved endwise. Nut $D^3$ is adjusted a trifle from time to time, as may be necessary to take up the wear of the parts and to allow the lock always to be firmly seated in the successive slots, so as to hold the turret rigidly as against turning on its axis and still to admit of the turret's sliding endwise on the lock in advancing and retiring the tool. As the locking occurs at the periphery of the turret and as the tools are some little distance nearer the axis of the turret, it is evident that if there were any inaccuracy in the locking device such inaccuracy would be decreased at the tool. For backing the lock in unlocking the turret is provided with lever $d$, fulcrumed at $d'$, this lever being operatively connected with rod D′ usually by means of the forked end of the lever engaging a circumferential groove of the rod or an attachment of the latter. Lever $d$ is provided with an upwardly-projecting pin $d^2$, that at the proper time is engaged by a cam $f'$, by which engagement the lever and lock are depressed so as to unlock the turret, the cam having a concentric section (see Fig. 3) that holds the lock back until it is opposite or nearly opposite the next succeeding notch of the turret.

$D^4$ is merely a long sleeve or bushing, usually of steel, and inserted in a hole in the bed-flange to give a better bearing for rod D′.

E is a cylinder journaled on the turret-shaft C′, and held from moving endwise on this shaft by means, for instance, of a shoulder of the shaft engaging the one end of the cylinder and a collar or nut of the shaft engaging the other end of member E. Cylinder E has a pair of rearwardly-projecting arms E′ E′, that constitutes the one member of a so-called "slip-clutch," the other or driving member of the clutch comprising wings or radial arms F F of sleeve G, these wings fitting easily between arms E′, so that while the two members of the clutch must revolve in unison cylinder E and arms E′ E′ may move endwise independent of sleeve G and its wings F F. It will be observed that cam $f'$, aforesaid, is mounted on the end of one of said wings F. Sleeve G is of considerable length and is journaled on the turret-shaft C′, this sleeve bearing a pinion G′ and a worm-gear $G^2$. This sleeve G is held from moving endwise by means of an annular groove $g$, that engages roller $g'$, this roller being journaled on a stationary stud $g^2$. Hence it will be understood that if shaft C′ be moved endwise it must slide within this sleeve in so doing. For reciprocating cylinder E endwise the cylinder is provided with an oblique or cam groove $E^2$, that engages a roller $e$, journaled on a stationary stud $e'$, studs $e'$ and $g^2$ being usually attachments of the bed. The end movement of the cam-cylinder E or "cam," as I will hereinafter call it, is imparted to shaft C′, and from thence is imparted to the turret, whereby the tools are advanced to their work and retired therefrom, of course all but one tool at a time—to wit., the tool oposite the work being idle. Cam-groove $E^2$ has a section (shown in Fig. 3) that extends circumferentially, whereby this cam E has a dwell endwise while the turret is being rotated from one locking notch $c'$ to another, this dwell occurring while the cam and tools are at the extremes of their rearward movement.

For rotating the turret one notch at a time, and this of course must occur while the tools are drawn back from the work, I provide as follows: A pin $f$ is fastened to one of the wings F aforesaid, this pin extending forward with an easy fit through a longitudinal hole in cam E. While the cam is in its forward position the free end of this pin is within the hole; but when the cylinder and turret are at or near the extremes of their movement the free end of pin $f$ protrudes from the cylinder and engages a pin $c^2$, projecting from the rear end of the turret, there being as many pins $c^2$ as there are tools in the turret, and as such engagement occurs just as the turret is unlocked the turret by such engagement of the pin is rotated one notch, and just as the turret is again locked the forward movement of the turret disengages these two pins. The different tools are successively advanced and retired directly by the action of cam E, this cam making a complete revolution in advancing and retiring a tool and in rotating the turret one notch. It must be borne in mind that the end movement of the turret-shaft and cam E is independent of sleeve G, the latter having no end movement. On the other hand, the cam and sleeve, by means of the slip-clutch aforesaid, rotate continuously and in unison, while the turret rotates intermittently by means aforesaid. Now some of the tools must feed much slower than it is desirable to feed some other tools. For instance, a very small drill or a roughing-tool having a heavy cut would require a much slower feed than, for instance, a threading-die or a finishing-tool having a light cut; and in order to give different feed to different tools, and by means of the same cam E, I simply vary the speed of the cam to meet the requirements of each tool, and this I accomplish in the following manner: Worm-gear $G^2$, aforesaid, is engaged by a worm (not shown) mounted on the inner end of a lateral shaft $G^3$, and on this shaft is mounted tight and loose pulleys, respectively, $h$ and $h'$, the latter being provided at the inner end thereof with an eccentric $h^2$. On the overhanging or outer end of shaft $G^3$ is mounted loosely disk H, the latter having an overhanging friction-rim H'. Next, inside of disk H is rigidly mounted on shaft $G^3$ a ratchet-wheel $g^3$, the pawl $g^4$ for engaging the teeth of this rachet-wheel being pivoted to the rear face of disk H. Hence if disk H be turned in the one direction by means of the ratchet-wheel and pawl it will rotate shaft $G^3$, and this shaft by other means might be rotated in the same direction without rotating the disk. When the belt is on the tight pulley $h$, shaft $G^3$, sleeve G, and cam E are rotated somewhat fast, and this occurs while the tools are being drawn back from the work and while the turret is being turned one notch. Next the belt is shifted onto the loose pulley $h'$, whereupon the eccentric $h^2$, connected with the loose pulley, furnishes the slow feed for advancing the tool.

The transmitting mechanism from eccentric $h^2$ back to shaft $G^3$ may be as follows: The eccentric is of course provided with an eccentric strap and rod, the latter $h^4$ connecting with rock-arm I' of rock-shaft I. The overhanging end of this rock-shaft is provided with a head $I^2$, the latter having a slot or recess $i^3$ extending across the face thereof, this slot having undercut side walls, and in this slot is fitted a sliding block $i$, bearing a laterally-projecting wrist-pin $i'$. The throw of the eccentric oscillates the rock-shaft I, and the consequent throw of wrist $i'$ will be greater or less, according as this wrist is adjusted farther from or nearer to the axis of the rock-shaft. Connecting with wrist $i'$ is a pitman J, the latter having a slot J' adapted to fit astride a block $G^4$, mounted on shaft $G^3$ just outside of disk H. The shaft has also a collar just outside the pitman to hold the latter in place, whereby the upper end of the pitman is guided so that the pitman always maintains a radial position relative to disk H and its friction-rim. This pitman is provided with lateral arm $J^2$, extending in opposite directions. The one arm $J^2$ is provided with a lateral stud or pin $j$ and the other arm is provided with a similar stud $j'$.

$J^3$ and $J^4$ are friction-pawls extending in opposite directions, each pawl having a notch near the outer end thereof, these notches fitting easily astride rim H'. The inner end of pawl $J^3$ rests on stud $j$, and this pawl has a spring $j^3$, adapted to bear down on the pawl. The inner end of pawl $J^4$ engages the under side of stud $j'$, and this pawl has a spring $j^4$, adapted to press this pawl upward. Each spring $j^3$ and $j^4$ has a forked end, the prongs whereof fit astride and hold the pawls laterally. With the upward movement of pitman J stud $j$ first elevates the inner end of pawl $J^3$, causing this pawl to cramp on or grip rim H', after which the farther upward movement of the pitman and pawl moves the left-hand side of wheel H upward (relative to Fig. 2) and at the same time spring $j^4$ holds pawl $J^4$ in position for the descending or right-hand side of the rim to move freely downward between the prongs of the latter pawl. With the downward movement of the pitman pawl $J^4$ actuates the wheel and pawl $J^3$ backs idly downward. The action of these pawls therefore impart to wheel H almost a continuous movement always in the same direction, and the movement is so nearly continuous that the irregularity is imperceptible at the tools, and the two pawls may slide endwise on their studs to accommodate themselves in their up and down movements to the curvature of rim H'. For shifting block $i$ endwise to vary the throw of pitman J is provided as follows:

K is a rod connecting block $i$ with the free end of lever L, this lever being fulcrumed at L' and bearing a roller $l$, that is adapted to travel on the ends of the segmental block $m$, the latter being fastened to rim M' of wheel M. Lever L is provided with a spring, as at $l'$, the action of this spring holding the lever forward, so that roller $l$ always engages the aforesaid block $m$. The securing-bolts $m'$ of the different segmental blocks $m$ operate in slots of rim M', whereby blocks $m$ may be adjusted forward and rearward, as required in shifting lever L and the connected block forward or rearward in giving more or less stroke to pitman J. Wheel M is rigidly mounted on shaft N, this shaft being provided with a gear $n$, engaging pinion G', aforesaid, this gear being as many times a multiple of the pinion as there are tools in the turret, and as there are supposed to be four tools in the present instance, the relative sizes of gear $n$ and pinion G' are as four to one. Therefore, while pinion G', sleeve G, and cam E are making one revolution and thereby advancing and retiring the turret and turning the turret one notch, meantime gear $n$, shaft N, and wheel M are making one-quarter of a revolution. Hence it follows that one-quarter circumferentially of wheel M, or rather of the segmental blocks $m$, connected with the rim of the wheel, are devoted to actuating each of the different tools of the turret, and the block for each particular tool may be adjusted endwise to give the feed adapted to such tool.

A prudent operator in adjusting the feed for a different kind of work will likely at first give each tool a light feed and then increase the feed of each tool as he thought advisable, and this could be done without stopping the machine. The movement of wheel M is slow, and after a given block $m$ has passed roller $l$ the operator can loosen its securing-bolt, adjust the block, and tighten the bolt without difficulty, and this too while the wheel is in motion.

P is the belt-shifter fulcrumed at P', this belt-shifter having a V-shaped head $p$, the apex thereof presenting upward, and this head is in close proximity to the inner or forward face of wheel M. The latter is provided with a series of studs $m'$, alternate studs being adapted to engage the one incline of head P and thereby shift the belt in the one direction and the intervening studs being adapted to engage the other incline or face of head $p$ and thereby reverse the belt-holder and belt. These studs are adjustable circumferentially of the wheel, usually by means of the securing-nuts thereof being located in circumferential grooves of the wheel, (see Fig. 6,) such grooves having undercut walls. While the belt is on the tight pulley, the feed, as aforesaid, is rapid in retiring the turret, and while the belt is on the loose pulley the feed is variable according to the requirement of each tool. I would remark that one segmental block $m$ is not likely to project but a short distance—say an eighth or a quarter of an inch—beyond the next adjacent block, and the steps from one block to another are such that roller $l$ can easily mount them, and were it otherwise the blocks could be beveled at the corners, so that the roller would mount a short incline rather than an abrupt step.

A machine should be constructed for the turret to carry the largest number of tools that will be wanted for any work that is to be done on the machine, and in doing work requiring fewer tools one or more tools can be omitted, in which case studs $m'$ are so arranged that the idle movements of the turret are produced by the belt operating on the tight pulley $h$, whereby such idle movements of the turret are made so rapidly that but little time is lost by reason of a tool being omitted from the turret.

The machine having been provided with all the tools necessary for all the different kinds of work to be done on the machine, the adjusting of the mechanism necessary in changing from one kind of work to another can be done in a few minutes, so that if only a small number of screws of a different kind is wanted it is cheaper to adjust the machine and do this amount of work thereon than it is to do the work by other means. It will be seen that in adapting the machine to different kinds of work nothing except the tools are removed from or attached to the machine. Hence the changes can, as aforesaid, be made very quickly. Instead of one long segmental block $m$ for regulating the feed of a tool, in some instances it would be better to have two or more short segments, so that, if necessary, the speed of the tool could be varied while doing its work.

R is a so-called "side" tool or "cutting-off" tool, and, as such side tool and the mechanism for operating the same are common to about all of this class of machines, it is not considered necessary to describe the same.

What I claim is—

1. The combination, with a tool-bearing turret, of a cam for actuating said turret toward and from the work and suitable mechanism for varying the speed of the cam according to the requirements of the respective tools, substantially as set forth.

2. The combination, with turret and cam for operating the turret endwise, of a feed-wheel operatively connected with such cam, and a pitman bearing pawl set in reverse order for actuating the feed-wheel in the same direction with the reverse movement of the pitman, substantially as set forth.

3. The combination, with a feed-wheel, of a pitman bearing pawls set in reverse order for actuating the feed-wheel in the same direction with the reverse movements of the pitman, the latter having a movable fulcrum connecting with an oscillating head, the fulcrum being adjustable toward and from the axis of such head for varying the throw of the pitman, substantially as set forth.

4. The combination of a feed-wheel and pitman and pawls for actuating the feed-wheel in the same direction with the reverse movement of the pitman, the latter having a slot engaging a member of the shaft of the feed-wheel for holding the pitman radially with the wheel, substantially as set forth.

5. The combination, with a feed-wheel having an overhanging friction-rim, of a pitman bearing friction-pawls set in reverse order for engaging such friction-rim and springs for backing the pawls, substantially as set forth.

6. The combination, with a feed-wheel having a friction-rim, of a pitman acting radially with such wheel, and the pitman bearing friction-pawls set in reverse order for actuating the wheel in the same direction with the reverse movement of the pitman, such pawls having end-play to accommodate the curvature of the friction-rim, substantially as set forth.

7. The combination, with a feed-wheel bearing a friction-rim, of a pitman having pawls adapted to actuate the wheel in the same direction with the reverse movement of the pitman, and springs for backing the pawls, such springs having prongs acting astride the pawl for holding the pawls laterally, substantially as set forth.

8. The combination, with a feed-wheel having an overhanging friction-rim, of a pitman acting radially with such wheel, and the pitman bearing pawls set in reverse order, the pawls having prongs acting astride the friction-rim, the pawls being backed with springs and having end-play, substantially as set forth.

9. The combination, with a feed-wheel having a friction-rim, of the pitman bearing pawls adapted to actuate the wheel in the same direction with the reverse movement of the pitman, and springs for backing the pawls, such springs having prongs acting astride the pawls for holding the pawls laterally, substantially as set forth.

10. In combination, a feed-wheel, and pitman and pawl for actuating the feed-wheel in the same direction with the reverse movement of the pitman, such pitman having a fulcrum connecting with an oscillating member, such fulcrum being movable toward and from the axis of oscillation, substantially as set forth.

11. In combination, a feed-wheel, pitman and pawls for actuating the feed-wheel, substantially as indicated, such pitman having an oscillating fulcrum movable toward and from the axis of oscillation, a lever operatively connected with and adapted to shift such fulcrum to vary the throw of the pitman, a wheel bearing adjustable blocks or segments, a lever bearing a roller for engaging such segments, and a spring acting on the lever in the direction to hold the roller in contact with such segment, substantially as set forth.

12. In combination, a tool-bearing turret and a cam for actuating the turret endwise, the feed mechanism for rotating such cam, such feed mechanism including a pitman and pawl, the pitman bearing pawls, the pitman having a movable fulcrum for varying the throw of the pitman, a wheel bearing blocks or segments adjustable therewith, such wheel being intergeared with the rotative mechanism of the cam, such wheel making one revolution while the cam revolves as many times as there are tools in the turret, and a lever bearing a roller adapted to engage and travel on such adjustable segments or blocks, the lever being operatively connected with the fulcrum of the pitman, substantially as set forth.

13. The combination, with a turret, a cam for feeding the turret endwise, and the mechanism for rotating the turret, substantially as indicated, of a feed-shaft operatively connected therewith and bearing tight and loose pulleys, and the loose pulley bearing an eccentric with transmitting mechanism, substantially as shown, from such eccentric to the feed-shaft, substantially as set forth.

14. The combination, with a turret and the variable feed mechanism for the same, substantially as indicated, such feed mechanism including a feed-shaft bearing tight and loose pulleys, the loose pulley bearing an eccentric, the latter being operatively connected with the feed-shaft by means of adjustable mechanism for varying the speed of the shaft, of an automatic belt-shifter timed to shift the belt onto the loose pulley for imparting the forward movement to the turret and for shifting the belt onto the tight pulley in retiring and rotating the turret, substantially as set forth.

In testimony whereof I sign this specification, in the presence of two witnesses, this 24th day of December, 1890.

JAMES B. CLYNE.

Witnesses:
C. H. DORER,
WARD HOOVER.